United States Patent [19]

Barcomb et al.

[11] Patent Number: 5,222,680
[45] Date of Patent: Jun. 29, 1993

[54] APPARATUS FOR REWINDING LIQUID FILTRATION MEDIA

[75] Inventors: Lyle B. Barcomb; Joseph A. ElHindi, both of New York; Richard J. Cross, Waterville, all of N.Y.

[73] Assignee: Filter Tech, Inc., Manlius, N.Y.

[21] Appl. No.: 802,288

[22] Filed: Dec. 4, 1991

[51] Int. Cl.⁵ .................... B65H 18/10; B65H 75/18
[52] U.S. Cl. .................... 242/67.3 R; 242/71.8; 242/68.4; 210/387
[58] Field of Search ............ 242/67.1 R, 67.2, 67.3 R, 242/71.8, 71.9, 68.4, 68, 115, 116, 118.5; 210/387

[56] References Cited

U.S. PATENT DOCUMENTS

| | | | |
|---|---|---|---|
| 780,689 | 1/1905 | Smith | 242/71.9 |
| 2,243,667 | 5/1941 | Busa | 242/67.1 R |
| 3,132,820 | 5/1964 | Toll | 242/67.1 R |
| 3,392,930 | 7/1968 | Goldfarb | 242/67.2 |
| 3,598,332 | 8/1971 | Sharkey | 242/71.8 |
| 3,737,230 | 6/1973 | Meijel et al. | 242/67.3 R X |
| 3,830,442 | 8/1974 | Kubovich et al. | 242/67.1 R X |
| 4,491,283 | 1/1985 | Pav et al. | 242/67.2 X |
| 4,500,046 | 2/1985 | Woenker | 242/67.1 R |

Primary Examiner—John M. Jillions
Attorney, Agent, or Firm—Charles S. McGuire

[57] ABSTRACT

Used media from a liquid filtration tank is wound on a reel assembly having a pair of flat, circular end plates, a central spindle and a pair of hollow rods. End portions of the spindle extend through central openings in the end plates which may be releasably engaged with the spindle by set screws. The spindle end portions are cut away on one side to allow radial movement on and off a pair of spaced, axially aligned, rotatably supported stub shafts to which the end portions may be releasably attached by hitch pins extending through aligned openings in the spindle end portions and stub shafts. A pair of lugs are affixed to and extend inwardly from the inner surfaces of the end plates, equally spaced on diametrically opposite sides of the central opening. The lugs extend into the ends of the hollow rods when the reel assembly is rigidly assembled, and are released from the rods by releasing the engagement of one or both end plates with the spindle and removing the end plate. A bundle of used media wound about the two rods may then be easily removed. Frame means support a motor which is drivingly engaged with one of the stub shafts, a guide roller and a scraper bar over which the media pass to remove a significant amount of the contaminants from the media surface.

18 Claims, 3 Drawing Sheets

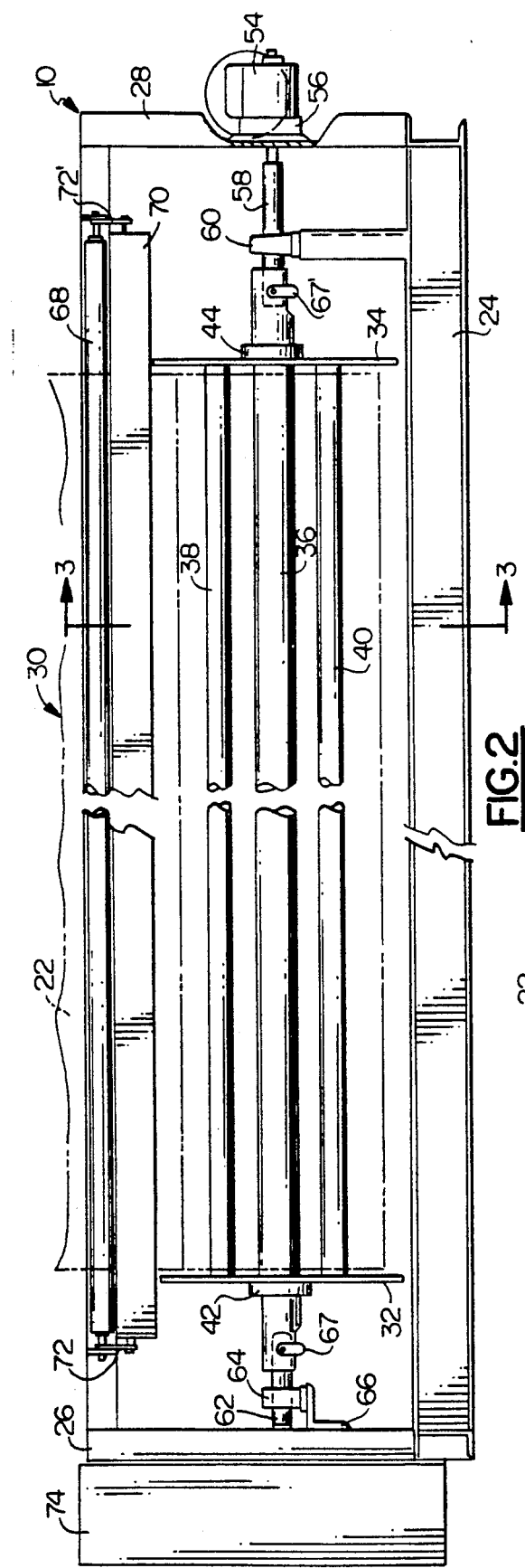
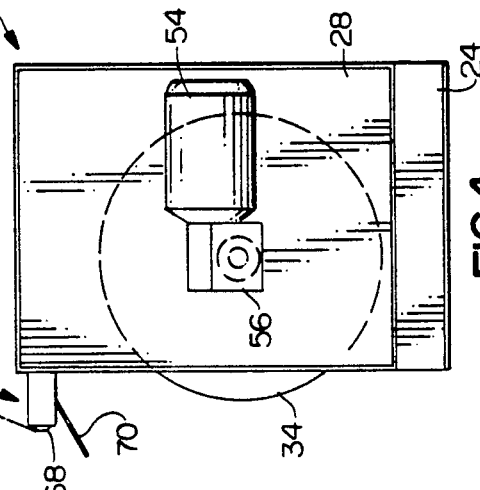
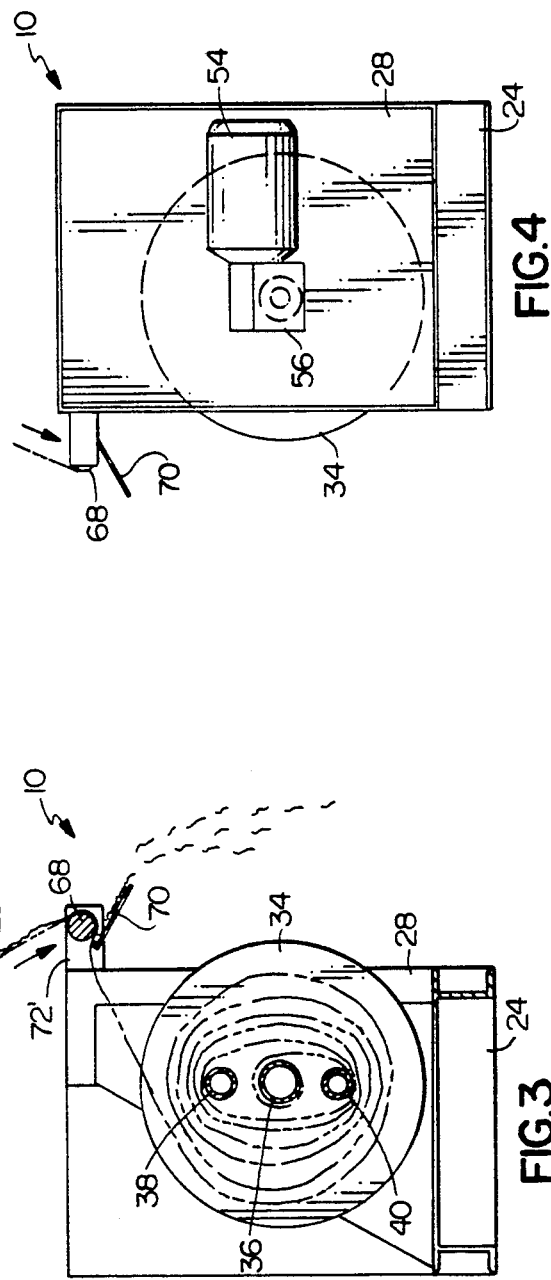

APPARATUS FOR REWINDING LIQUID FILTRATION MEDIA

BACKGROUND OF THE INVENTION

The present invention relates to novel and improved apparatus for rewinding disposable filter media typically used in a filtering process in which contaminants are removed from liquids used as coolants or lubricants in machining operations. A more specific feature of the invention is the ease of removal of the used media from a reel assembly upon which it is wound.

In typical liquid filtering apparatus, filter media is fed into the apparatus from a roll positioned at the rear of the apparatus. The media passes through the filtering apparatus on the upper run of a continuous belt or chain which travels on guide rollers positioned appropriately throughout the apparatus. As the filter media travels through the filtering apparatus the liquid passes through the media leaving a layer of contaminant, known as "cake", on the media before the latter is removed at the front of the apparatus for collection and disposal. Although filtration apparatus has been provided with means to wind used media on a spindle, or the like, it has often been difficult to separate the bundle of wet, dirty media from the member upon which it is wound. That is, the media tends to be wound tightly upon and to cling to the winding apparatus, making the removal and disposal of used media both time consuming and cost inefficient. The same is true if the used media is later unwound from the spindle, or if the reel or spindle structure is discarded together with the used media.

It is a primary object of this invention to provide a novel and improved media rewinder for a liquid filtration apparatus which allows for easy removal of used media from a reel.

It is a further object of this invention to provide a novel and improved media rewinder for a liquid filtration apparatus which simplifies the collection and disposal of used media, thereby contributing to the overall efficiency of the filtering operation.

Another object is to provide apparatus for use in conjunction with a liquid filtration operation wherein contaminants are automatically removed from the surface of used media as it is wound on a collapsible reel assembly.

Other objects will in part be obvious and will in part appear hereinafter.

SUMMARY OF THE INVENTION

In achieving the foregoing objects, the present invention provides, in conjunction with otherwise conventional liquid filtration apparatus, novel rewinding apparatus for cleaning and collecting used media which has passed through a filtering operation. The rewinding apparatus includes suitable stationary members rotatably supporting a reel assembly, a guide roller for directing the used media to the reel assembly, a scraper bar for removing contaminants which have collected on the media surface during the filtering operation, and an electric motor for imparting rotation to the reel assembly.

A central spindle of the reel assembly is removably attached at its opposite ends to stub shafts which are supported in pillow blocks. The motor is drivingly engaged with one of the stub shafts. In addition to the spindle, the reel assembly includes a pair of hollow rods and a pair of flat, circular end plates, each having a central opening surrounded on the outer plate surface by a collar having a threaded opening for receiving a set screw. Two lugs extend inwardly from each inner plate surfaces, equally spaced from and on diametrically opposite sides of the central opening.

The reel assembly elements are placed in assembled relation by sliding the opposite ends of the central spindle through the end plate openings and moving one or both of the end plates toward the center of the spindle while positioning the pair of hollow rods to receive the lugs on the inner surfaces of the end plates. The spacing of the end plates is determined by the length of the hollow rods which, of course, are substantially equal in length to one another and shorter than the central spindle. The set screws in the end plate collars are then tightened, providing a rigid reel assembly, end portions of the central spindle are placed on the stub shafts and releasably secured thereto with hitch pins.

Used media which exits the filter tank is passed over the rewinder guide wheel and scraper bar and engaged with the reel assembly. As the reel assembly is rotated, used media is wound about the two hollow rods after excess contaminants have been removed by the scraper bar. When the reel is full, the hitch pins are removed and the spindle is lifted off the stub shafts. One or both end plates are removed from the spindle after loosening the set screw(s), thereby disengaging the lugs from the ends of the hollow rods. This releases any tight engagement between elements of the reel and the bundle of media which may then be easily slid off of the rods and spindle. Handling and disposal of the relatively clean, used media, from which excess contaminants have been removed by the scraper bar, is thus greatly simplified. Also, the metal turnings, chips, etc., which typically form a large portion of the removed contaminants, may be more easily recovered and recycled.

BRIEF DESCRIPTION OF THE DRAWINGS

FIG. 2 is front elevational view of the rewinding apparatus;

FIG. 3 is a side elevational view of the rewinding apparatus in section on the line 3—3 of FIG. 2;

FIG. 4 is a side elevational view of the rewinding apparatus; and

DETAILED DESCRIPTION OF THE PREFERRED EMBODIMENT

Figure 1:
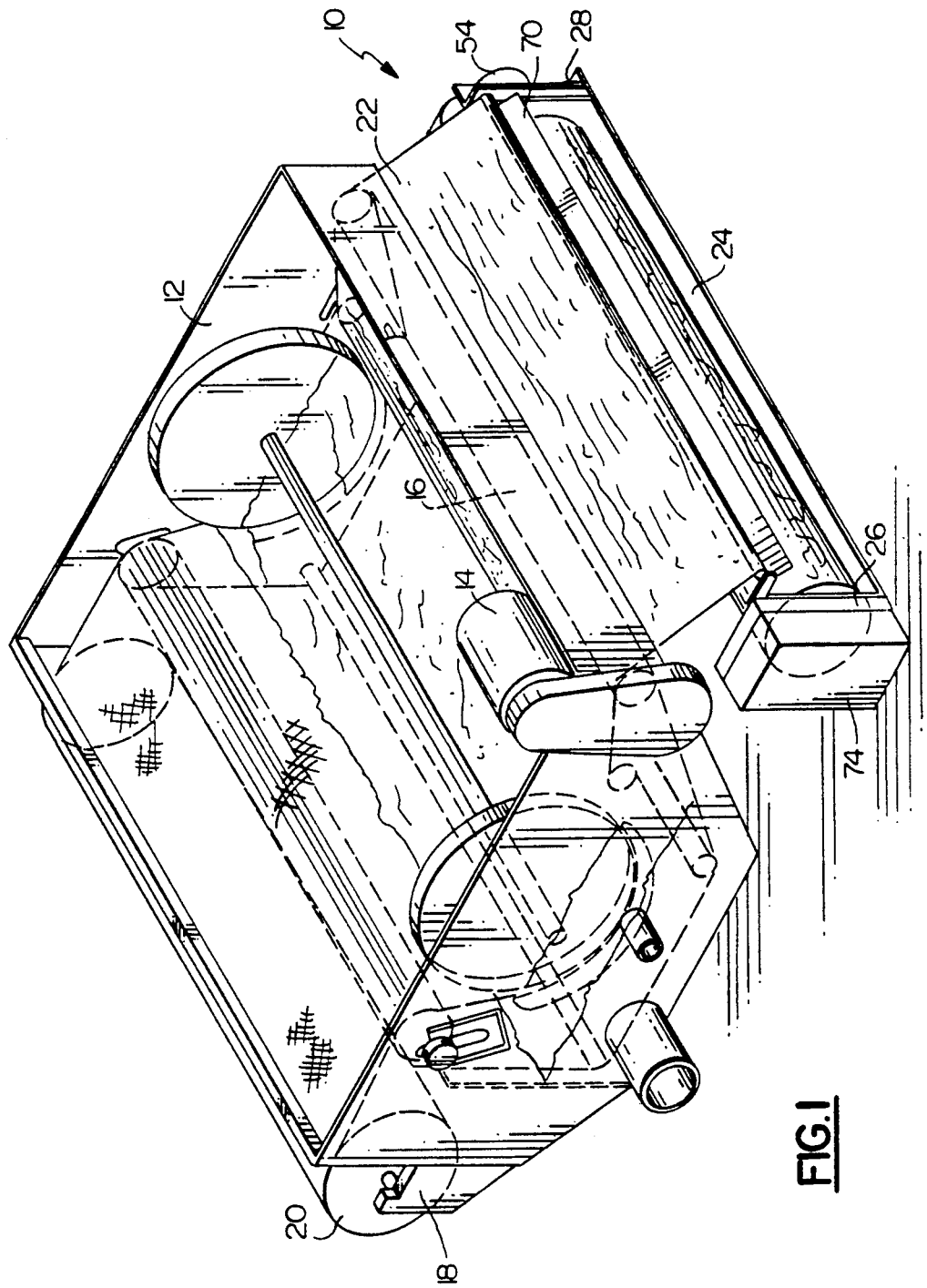
FIG. 1 is a perspective view showing the rewinding apparatus in conjunction with the filtering apparatus.

The media rewinding apparatus of the present invention, denoted generally by reference numeral 10, is used in conjunction with otherwise conventional liquid filtration apparatus. Although such filtration apparatus, commonly used to remove contaminants from liquids used as lubricants and coolants in machining operations, or the like, may take a variety of forms, a typical example is shown in FIG. 1. In general, the filtration apparatus includes tank 12, having an upper compartment for receiving the contaminated liquid, and a lower compartment in which the clean filtrate is collected. An endless, open-mesh chain or belt passes around a series of guide wheels and rollers establishing upper and lower runs of the chain. Motor 14 imparts rotation to guide roller 16 which includes sprockets, or the like, drivingly engaged with the chain to move the latter through its endless path.

Support means 18 at the rear of tank 12 hold a roll 20 of liquid pervious filter media which is fed on to the upper run of the chain for movement through tank 12 from the rear to the front end thereof. The upper run of chain and media separate the upper and lower compartments of tank 12, whereby liquid passes through the media and chain from the upper to the lower compartment with contaminants retained on the upper surface of the media. After passing over guide roller 16, the chain begins the lower run of its travel while the used media 22 is removed and collected on rewinder 10 in the manner explained hereinafter.

Rewinder 10 includes a frame having bottom member 24, which allows rewinder 10 to be placed on flat, horizontal surface, and left and right side members 26 and 28, respectively, affixed to opposite ends of bottom frame member 24 and extending upwardly therefrom. A reel assembly, generally denoted by reference numeral 30 includes a pair of essentially flat, circular endplates 32 and 34, center spindle 36 and two hollow rods 38 and 40 which extend horizontally between endplates 32 and 34 in the assembled condition. Endplates 32 and 34 have centrally positioned circular openings surrounded by collars 42 and 44 which extend outwardly from one surface of each endplate. Opposite end portions of center spindle 36 extend through the central openings in endplates 32 and 34 which are releasably held in place on spindle 36 by set screws 46 and 48 passing through threaded openings in collars 42 and 44. Hollow rods 38 and 40 are of substantially equal length. Lugs 50, 50' and 52, 52' (FIG. 5) are formed integrally with or fixedly attached to the surfaces of endplates 32 and 34, respectively, opposite collars 42 and 44, equally spaced from and on diametrically opposite sides of the central openings. When reel assembly 30 is assembled, as described later, the lugs extend into the open ends of rods 38 and 40.

Figure 5:
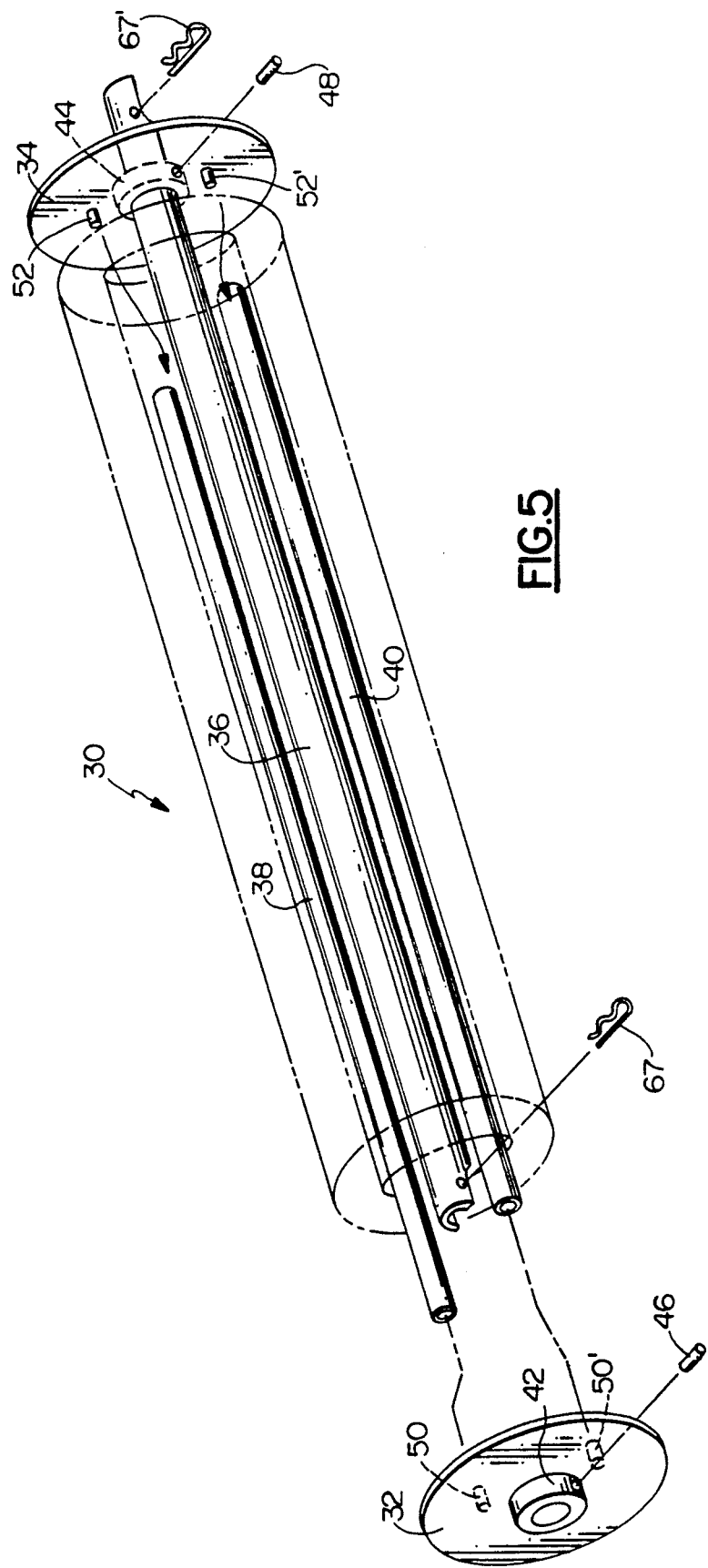
FIG. 5 is an exploded perspective view showing the reel assembly elements of the rewinding apparatus.

Conventional electric motor 54 is mounted on the outer surface of side frame member 28. The output shaft of motor 54 is connected, through a suitable gear reducer and clutch within housing 56, to stub shaft 58 supported in bearings within pillow block 60. Stub shaft 62 is supported in a similar fashion by pillow block 64, mounted on bracket 66 which is attached to the inwardly facing surface of side frame member 26, all as shown in FIG. 2. End portions of spindle 36 are cut away on the sides, as best seen in FIG. 5, to permit the spindle to be moved in a radial direction into and out of axial alignment with stub shafts 58 and 62. Both the spindle end portions and stub shafts have through openings which may be aligned for passage of hitch pins 67, 67' to releasably couple spindle 36 to stub shafts 58 and 62.

Reel assembly 30 is assembled by placing end plates 32 and 34 on the ends of spindle 36, with the latter extending through the central openings in the end plates and surrounded by collars 42 and 44. As the end plates are moved toward one another, lugs 50 and 52 are inserted in the hollow ends of rod 38, and lugs 50' and 52' are inserted in the ends of rod 40. Set screws 46 and 48 are tightened to provide a rigid reel assembly with rods 38 and 40 equally spaced from and parallel to spindle 36. Reel assembly 30 is the assembled with rewinder 10 by placing the cut-away end portions of spindle 36 upon stub shafts 58 and 62, aligning the openings, and inserting hitch pins 67, 67'. Rotation of motor 54 will then be imparted to reel assembly 30. Electrical control panel 74 is mounted upon side support 26.

Rewinder 10 further includes guide roller 68 and scraper bar 70, each supported between arms 72, 72' on the upper, front part of rewinder 10. Arms 72, 72' are suitably attached to side frame members 26 and 28. Used media 22 coming from the front end of tank 12 is fed around guide roller 68 and over an edge portion of scraper bar 70, as best seen in FIG. 3, and suitably engaged with central spindle 36 and/or rods 38 and 40. As reel assembly 30 is rotated, used media 22 will be wound about rods 38 and 40 after excess contaminants have been removed by scraper bar 70 for separate collection and disposal or recycling.

When the supply of media runs out, or when reel assembly 30 is full, the bundle of used media is removed from the reel assembly. The media web is severed, if necessary, and hitch pins 67, 67' are removed, permitting the reel assembly to be lifted off stub shafts 58 and 62. One (or both) of set screws 46 and 48 are loosened to permit one (or both) of end plates 32 and 34 to be removed from spindle 36. Upon outward movement of either or both end plates, rods 38 and 40, upon which media 22 is wound, may move inwardly, toward spindle 36. Thus, the bundle of media is not tightly engaged with any portion of reel assembly 30 and may be easily slid off spindle 36 and rods 38 and 40 in an axial direction. Reel assembly 30 is then re-assembled and placed back on rewinder 10, and the leading end of the media web is affixed to the reel assembly in the manner previously described.

What is claimed is:

1. Rewinder apparatus for use in conjunction with a liquid filtration system wherein a continuous web of disposable media is moved in a direction from the rear to the front of a tank for collection of contaminants on a surface of the media as liquid passes therethrough, said rewinder apparatus comprising, in combination:

a) a reel assembly including:
  i) a pair of essentially flat end plates, each having inner and outer surfaces, a centrally disposed opening, and a pair of lugs extending fixedly from each of said inner surfaces on diametrically opposite sides of said opening;
  ii) a linearly elongated spindle of a first length having opposite end portions of smaller cross dimensions than said end plate openings, whereby said end plates may be placed on said spindle with said inner surfaces facing one another and said spindle end portions extending through said openings and outwardly of said outer surface;
  iii) a pair of rods of substantially equal, second length shorter than said first length, said rods each having opposite end portions configured for releasable engagement with said lugs, whereby said end plates may be positioned on said spindle spaced by substantially said second length with said lugs engaged with said rod end portions to support said rods between said end plates substantially parallel to one another and to said spindle; and
  iv) means for releasably fixing said end plates to said spindle;
b) support means constructed and arranged to support said spindle end portions with said reel assembly forwardly of said tank with said spindle and rods extending substantially perpendicular to said direction of web movement;

c) means for releasably attaching said spindle end portions to said support means; and d) means for imparting rotation to said reel assembly about said spindle, whereby media exiting the front of said tank may be wound about said rods and removed from said reel assembly by removing said spindle from said support means, releasing said means fixing at least one of said end plates to said spindle, removing said at least one end plate from said spindle to release the engagement of said rods from said lugs, and sliding said media off said spindle and said rods.

2. The rewinder apparatus of claim 1 wherein said means for releasably fixing said end plates to said spindle comprise a pair of set screws.

3. The rewinder apparatus of claim 2 wherein each of said end plates further includes a collar encircling said centrally disposed opening and having an internally threaded, radially extending opening for receiving said set screws.

4. The rewinder apparatus of claim 1 wherein said support means comprises a pair of stub shafts, each rotatably supported in spaced, axial alignment by a distance less than said first length and greater than said second length, for releasable attachment to said spindle end portions.

5. The rewinder apparatus of claim 4 wherein each of said stub shafts and said spindle end portions include through, alignable openings, and said means for releasably attaching comprise a pair of pins removably insertable through the aligned openings of said spindle end portions and said stub shafts.

6. The rewinder apparatus of claim 5 wherein said means for imparting rotation comprises an electric motor operatively coupled to one of said stub shafts.

7. The rewinder apparatus of claim 6 and further comprising frame means including a bottom member having opposite ends and first and second side members attached to and extending upwardly from said bottom member outwardly of said support means, said motor being fixedly mounted on one of said frame side members.

8. The rewinder apparatus of claim 7 and further including means supported by said frame means for removing excess contaminants from said media surface in advance of winding thereof on said reel assembly.

9. The rewinder apparatus of claim 8 wherein said contaminant removing means comprises a scraper bar having an edge portion extending laterally across and contacting said media surface.

10. The rewinder apparatus of claim 9 and further including a guide roller rotatably supported by said frame means adjacent said scraper bar and extending along an axis parallel to said scraper bar edge portion.

11. Apparatus for cleaning and collecting used media fed in a continuous web from a liquid filtration tank, said used media carrying on a surface thereof contaminants collected as liquid passes through said media, said apparatus comprising:

a) a reel assembly including:
   i) a pair of substantially flat end plates;
   ii) at least two elongated rods, one of which includes end portions extending outwardly from each of said end plates;
   iii) means for mutually assembling said end plates and said rods in rigidly connected relation with inwardly facing surfaces of said end plates in spaced, parallel planes and said rods extending between said inwardly facing surfaces, spaced from and parallel to one another; and
   iv) means for releasing said rods and said end plates from said rigidly connected relation and separating at least one of said rods from both of said end plates and the other of said rods from at least one of said end plates;

b) guide means establishing a path for used media from said tank to be wound about both of said rods;

c) cleaning means interposed in said path between said guide means and said rods for contact by said media surface to remove said contaminants therefrom;

d) means supporting said reel assembly, said guide means and said cleaning means in mutually operative relationship, said supporting means comprising a frame including bottom and side members, and means for rotatably holding said one rod end portions comprising a pair of stub shafts supported in axial alignment and means for releasably coupling said one rod end portions to respective ones of said stub shafts.

12. Apparatus according to claim 11 wherein said guide means comprises an elongated roller, and said reel assembly and said roller are rotatable about spaced, parallel axes.

13. Apparatus according to claim 12 wherein said cleaning means comprises a scraper bar supported by said support means with an edge portion extending across and contacting said media surface.

14. Apparatus according to claim 11 wherein said guide means comprise an elongated roller rotatable about an axis, and said cleaning means comprises a scraper bar having an elongated edge portion parallel to said axis and in close proximity to said roller.

15. Apparatus according to claim 11 wherein said one rod extends through centrally disposed openings in each of said end plates, and further including means for releasably fixing said end plates to said one rod.

16. Apparatus according to claim 15 wherein each of said stub shafts and said one rod end portions include through openings, and said releasable coupling means comprise a pair of hitch pins for respective insertion through aligned openings in said one rod end portions and said stub shafts.

17. Apparatus for cleaning and collecting used media fed in a continuous web from a liquid filtration tank, said used media carrying on a surface thereof contaminants collected as liquid passes through said media, said apparatus comprising:

a) a reel assembly including:
   i) a pair of substantially flat end plates;
   ii) three elongated rods, one of which includes end portions extending through centrally disposed openings in said end plates, and the other two of which extend between releasable holding means on said inner surfaces of said end plates;
   iii) means for mutually assembling said end plates and said rods in rigidly connected relation with inwardly facing surfaces of said end plates in spaced, parallel planes and said rods extending between said inwardly facing surfaces, spaced from and parallel to one another; and
   iv) means for releasing said rods and said end plates from said rigidly connected relation and separating at least one of said rods from both of said end plates and the other of said rods from at least one of said end plates;

b) guide means establishing a path for used media from said tank to be wound about both of said rods;

c) cleaning means interposed in said path between said guide means and said rods for contact by said media surface to remove said contaminants therefrom;

d) means supporting said reel assembly, said guide means and said cleaning means in mutually operative relationship; and e) means for imparting rotation to said reel assembly for winding said media thereon.

18. Apparatus according to claim 17 wherein said holding means comprise a pair of lugs fixedly attached to said inner surfaces of each of said end plates on opposite sides of said centrally disposed openings for telescoping engagement with end portions of said other two rods.

* * * * *